United States Patent Office 3,832,335
Patented Aug. 27, 1974

3,832,335
BARRIER POLYMERS HAVING HIGH HEAT DISTORTION TEMPERATURES
John William Bayer, Toledo, Ohio, assignor to Owens-Illinois, Inc.
No Drawing. Filed May 1, 1972, Ser. No. 249,361
Int. Cl. C08f 15/40
U.S. Cl. 260—80.81          19 Claims

ABSTRACT OF THE DISCLOSURE

Polymer compositions prepared by the interpolymerization of an intimate mixture of acrylonitrile, vinylidene chloride and acrylate monomers which are useful in the fabrication of packaging materials. The interpolymers of this invention can be readily formed by solvent casting, compression molding, calendering, extrusion, and blow molding techniques into films or containers having outstanding oxygen barrier properties thereby affording excellent protection against oxygen degradation to oxygen sensitive materials packaged therein. Films and containers prepared from many of the preferred interpolymers of this invention also have surprisingly high heat distortion temperatures. This unique combination of properties makes these preferred polymeric materials ideally suited for the fabrication of hot-fill containers used in the packaging of oxygen sensitive foodstuffs, such as ketchup.

BACKGROUND OF THE INVENTION

Field of the Invention

This invention relates to interpolymer compositions and articles of manufacture prepared therefrom. More specifically, the interpolymers of this invention are the product of the interpolymerization of an intimate mixture of acrylonitrile, vinylidene chloride and acrylate monomers. Films and cointainers prepared from these interpolymers are useful in the preparation of food wrap and containers having outstanding oxygen barrier properties.

Description of the Prior Art

Certain foodstuffs such as milk, mayonnaise and ketchup are extremely sensitive to oxygen and upon exposure thereto, for even a limited period of time, undergo degradation in the form of discoloration, loss of change in taste, and/or loss of aroma. Similarly, many prescription and over-the-counter pharmaceutical preparations undergo oxidative degradation resulting in loss or decrease in their therapeutic value. Many of these same foodstuffs referred to above also contain bacteria which, upon exposure to oxygen proliferate, thereby rendering such foodstuffs unsuitable for human consumption.

In order to provide the food processor and drug manufacturer with packaging materials that will protect their products from the effects of undesirable oxidation, considerable research has been conducted into the gas transmission properties of a variety of polymers. Much of the earlier work in the development of food wrap materials involved preparation of moisture barrier and oxygen barrier (vinylidene chloride) compositions. One such composition, reportedly possessing good moisture barrier properties is prepared by solvent casting of a latex-like dispersion of a vinylidene-chloride-acrylonitrile-ethylacrylate terpolymer, U.S. Pat. 2,538,737. Evidently, the processing of this and related type compositions by more traditional thermoforming techniques requires the inclusion of certain essential materials, such as plasticizers, which can exude from or contribute odor to the films prepared from such compositions, thereby rendering them unsatisfactory for the packaging of foods, medicines, and other related materials. Interpolymers having substantial vinylidene chloride content have also found application in areas other than the packaging art. For example, interpolymers of acrylonitrile, vinylidene chloride and alkylacrylates are reportedly useful as coatings and in the preparation of printing pastes for cellulosic fabrics, U.S. Pats. 3,424,731, 3,248,040 and 2,678,924.

Subsequent developments in the field of orientation of upolymers has made possible the manipulation of distribution of the polymer chains in resins and articles of manufacture. This manipulation takes the form of aligning randomly distributed polymer chains along one or more common axes causing substantial increases in density or packing of the polymer. In certain instances, as in the case of polyvinylchloride (PVC), such orientation has resulted in some improvement in gas and moisture barrier properties of films and containers prepared from these materials. Other benefits, apparently inherent in the orientation process, are slight increases in the heat distortion temperature and substantial improvement in impact resistance of articles prepared from PVC resins. Orientation of many of these more common polymers (such as PVC, polyethylene, polypropylene, etc.) although enhancing one or more of the aforedescribed physical properties, has not as yet resulted in a product having a requisite combination of properties needed to meet the needs of food processors and drug manufacturers.

More recently, advances in processing techniques have now made practical the economical preparation of films and containers from "high nitrile" compositions traditionally considered impractical for such use. This advance in processing technology together with the development of an impact modified acrylonitrile-ethylacrylate copolymer composition by Standard Oil of Ohio ("Barex 210") and a methacrylonitrile-styrene copolymer by Monsanto ("Lopac") has resulted in more economical blow molding of containers having improved gas (especially oxygen and carbon dioxide) barrier properties for use by the soft drink industry. Reported initial evaluation of these compositions indicate that although gas transmission values are within acceptable limits, the "Lopac" type composition, as originally formulated, has poor impact resistance and "Barex 210," although having excellent impact resistance, does not have a sufficiently high heat distortion temperature to permit its use in the fabrication of hot-fiill containers.

SUMMARY OF THE INVENTION

This invention is a thermoplastic interpolymer prepared by addition polymerization wherein recurring nitrile, vinylidene chloride and acrylate units are randomly arranged relative to one another. This thermoplastic interpolymer is further characterized as having an oxygen transmission rate of about 50 cubic centimeters-mils per square inch year atmosphere or less and consisting essentially of:

(a) about 8 to about 69 weight percent of units from at least one nitrile monomer of the formula

where, R is hydrogen or methyl;
(b) about 8 to about 64 weight percent of units from vinylidene chloride; and
(c) about 22 to about 35 weight percent of units from at least one acrylate monomer of the formula

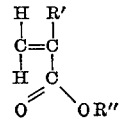

where, R' is hydrogen, or alkyl of 1 to 4 carbon atoms, and R" is methyl or ethyl, the combined concentration of units from nitrile monomer or monomers and vinylidene chloride being equal to at least about 65 weight percent.

In the preferred embodiments of this invention the thermoplastic interpolymers have an oxygen transmission rate of about 25 cubic centimeters-mils per square inch year atmosphere or less and a heat distortion temperature in excess of about 64° C. These preferred thermoplastic interpolymers consist essentially of about 23 to about 69 weight percent units from at least one nitrile monomer of the aforedescribed formula; about 8 to about 52 weight percent units from vinylidene chloride; and about 23 to 33 weight percent units from at least on acrylate monomer of the aforedescribed formula. The most preferred interpolymers of this invention will have in excess of about 40 weight percent of units of nitrile monomer. The combined concentration of units from the nitrile monomer or monomers and vinylidene chloride in both the preferred and most preferred embodiments of this invention should be at least about 65 weight percent.

Specific monomer mixtures which are especially useful in the preparation of the interpolymers of this invention are:

acrylonitrile-vinylidene chloride-methylacrylate
acrylonitrile-vinylidene chloride-ethylacrylate
acrylonitrile-vinylidene chloride-methylmethacrylate
acrylonitrile-vinylidene chloride-methylethacrylate
acrylonitrile-vinylidene chloride-isopropylethyacrylate
acrylonitrile-vinylidene chloride-isobutylethacrylate
methacrylonitrile-vinylidene chloride-methylacrylate
methacrylonitrile-vinylidene chloride-ethylacrylate
methacrylonitrile-vinylidene chloride-methylmethacrylate
methacrylonitrile-vinylidene chloride-methylethacrylate
methacrylonitrile-vinylidene chlroide-isopropylethacrylate
methacrylonitrile-vinylidene chloride-isobutylethacrylate

DESCRIPTION OF THE INVENTION

Interpolymer Preparation

The interpolymers of this invention can be prepared by free radical initiated addition polymerization of the aforedefined monomer mixtures in the appropriate proportion by a number of standard polymerization techniques, including solution, emulsion, bulk or suspension polymerization. Ordinarily, the relative concentration of the monomers in the charge will range from about 8 to about 69 weight percent nitrile monomer; about 8 to about 64 weight percent vinylidene chloride; and about 22 to about 35 weight percent acrylate monomer.

The relative arrangement of each of these monomers along the backbone of the resulting interpolymer will, of course, be determined by the relative reactivity ratios of the monomers, their concentration relative to one another in the charge; and the particular mode of polymerization. For example, in order to obtain maximum random distribution of these monomers only a small portion of the monomer charge is initially added to the resin kettle, polymerization initiated, and then the balance of the monomer added in increments or in a continuous manner.

The presently preferred mode of preparation of these interpolymers is emulsion polymerization which involves polymerization of the monomer charged in an aqueous medium containing an emulsifier and an initiator compound or componds. A polymerization system typical of that employed in standard emulsion polymerization comprises an aqueous medium having about 0.01 to about 5 weight percent emulsifier; about 0.01 to about 5 weight percent initiator; and anywhere from about 1 to 300 weight percent monomers. The monomer charge is typically added to the resin kettle in quantities sufficient to maintain the concentration of the polymerizable monomers therein at about 5 to about 50 weight percent based upon the water content of the kettle.

The apparatus used in emulsion polymerization will necessarily reflect the needs of the variables encountered in this mode of preparation. For example, the glass lined resin kettle into which the monomers and various ingredients involved in the polymerization are charged is usually provided with means for periodic or continuous addition of monomers; means for developing an inert atmosphere; and means for continuous agitation of the contents of the resin kettle.

As is well known, the addition polymerization of ethylenically unsaturated monomers can be initiated with peroxides, redox initiators or ultra-violet light. The initiator selected will determine to a great extent the process conditions prevailing during polymerization. For example, in the event a redox initiator is selected, interpolymerization of the monomers can generally proceed over a rather broad temperature range, whereas, the selection of a peroxide initiator can require heating of the contents of the kettle at least sufficiently to effect decomposition of the peroxide to the free radical. The formation of free radicals necessary to the interpolymerization of the monomers is also effected by the chemical nature of the atmosphere prevailing within the resin kettle. It is generally acknowledged, for example, that the presence of an oxidizing environment within the kettle is detrimental to the formation of free radicals and, therefore, a nonoxidizing atmosphere, such as argon or nitrogen, is preferred.

At the conclusion of the polymerization, the interpolymer can be separated from the reaction medium by a variety of methods. One such technique involves the coagulation of the latex-like interpolymer with a lower aliphatic alcohol followed by separation of the coagulated interpolymer by filtration. Once the interpolymer is separated from the charge it is customarily washed in a lower aliphatic alcohol, such as methanol, for the removal of any residual traces of emulsifier and/or water. The polymer can then be dried at about 50° C. under a vacuum for removal of this alcohol and other fluid residues.

Other variables commonly encountered in emulsion polymerization are readily apparent to the skilled polymer chemist and are, therefore, set forth in any of the standard reference texts on polymer synthesis, see Sorenson and Campbell, *Preparative Methods of Polymer Chemistry*, Interscience Publishers, Inc., New York (1962).

If desirable, lubricants, dyes, bleaching agents, plasticizers, pigments and antistatic agents may also be incorporated directly into the interpolymer or applied subsequent to the forming of the interpolymer into articles, such as films and containers.

The interpolymers of this invention can be fabricated into various articles of manufacture by solvent casting or preferably, by any one of a number of standard thermoforming techniques; including extrusion, blow molding, compression molding, or calendering. During the process of forming these interpolymers into stock materials or finished articles, the macromolecular arrangement of the polymeric chains in these materials can be altered by orientation of these randomly arranged chains along one or more predetermined axes.

Orientation of the polymeric chains in articles prepared from these resins can be accomplished by any one of a number of techniques well known in the art. For example, an interpolymer film can be oriented in a longitudinal direction by continuously passing a film thereof through a drafter or other similar device. A typical drafter can be a four-cell apparatus having two hot rolls and two cold rolls. One pair of these rolls is heated and generally rotates slower than the other pair of rolls placed in series with it. As the film passes over the heated rolls, it is drawn or stretched by the faster moving, non-heated rolls. The pair, or series, of rolls are usually closely spaced in order to provide almost continuous support for the film over the region subject to tension and thereby minimize the degree of transverse shrinking.

In orientation of either a container or film prepared from the interpolymer of this invention, the orientation temperature need exceed the heat distortion temperature of the particular interpolymer composition and yet be maintained below temperatures which will result in the interpolymer becoming molten. This temperature range, generally referred to as the viscoelastic range will vary somewhat from one interpolymer composition to another.

Orientation or macromolecular rearrangement of the interpolymer chains in these thermoplastic resins can also be achieved along more than one axis merely by simultaneously imparting stress or drawing the thermoplastic composition in the several directions of desired orientation. Containers having this type of multiaxial orientation can be prepared from extruded tubing of an interpolymer composition simply by feeding a tubular charge of the interpolymer directly from an extruder into an open multi-section mold and about a mandrel, closing the mold sections on the charge between the orifice and the mandrel, and introducing air pressure into the charge, thereby expanding the tubular charge to the extent permitted by the contours of the mold. A typical process for blow molding this type of multiaxially oriented plastic containers is comprehensively described in U.S. Pat. 2,810,934, which is hereby incorporated by reference. In a somewhat analogous manner, a multiaxially oriented film can be prepared by extruding thermoplastic resin through a tube die and expanding the tube around an air bubble thereby simultaneously inducing biaxial orientation of the polymeric chains in the film. This technique is comprehensively described in U.S. Pat. 3,565,876, which is also incorporated by reference.

The physical properties of the films and containers prepared from the resins of this invention can be readily determined by the skilled analytical chemist utilizing standard analytical equipment and techniques. For example, the heat distortion temperatures of materials prepared from these resins is readily ascertainable by merely inserting a sample of this thermoplastic material into a Thermomechanical Analyzer (Model 941, E. I. du Pont de Nemours, Wilmington, Del.) and monitoring the deflection of the sample under a constant stress over a programmed temperature range. Most of the unoriented thermoplastic interpolymers of this invention exhibit heat distortion temperatures in excess of about 64° C. making these materials ideally suited for fabrication of hot-fill containers.

Similarly, determination of the gas transmission rate of materials prepared from these resins can be determined in general accord with ASTM D-1436-66 Method V (volumetric), by simply placing a 10 mil thick film of the interpolymer, 2 inches in diameter into a Linde Cell; creating a pressure differential on one side of the film with a test gas (e.g., oxygen); collecting the gas permeating through the film in a capillary unit an equilibrium flux across the film is established; and monitoring the rate of change along the capillary thereby enabling calculation of the permeation value for the particular gas through the test specimen. The gas transmission rates for the interpolymers of this invention are reported in cubic centimeters-mils per square inch year atmosphere. Articles prepared from the interpolymers of this invention will have oxygen transmission rates of about 50 and preferably about 25 cubic centimeters-mils per square inch year atmosphere or less.

The inherent viscosity of these interpolymers was also determined in order to estimate the relative molecular weights of these interpolymers and correlate such values with the ease of forming of these resins. This technique involves comparison of the viscosity of a 0.2 weight percent solution of the interpolymer in dimethylformamide (DMF), to the viscosity of the pure solvent. Viscosity ranges of the products of this invention generally ranged between 0.300 to about 2.000, with the preferred resins having inherent viscosity of about 0.500 to about 1.000.

EXAMPLES

The examples which follow further illustrate the preparation of several solid interpolymers having the hereinbefore described physical properties. Comparative Examples 8, 9, and 13 have also been included to illustrate the effect that changes in composition and relative concentration can have on oxygen transmission and heat distortion temperature.

Examples 1 to 13

TABLE I.—MONOMERIC MIXTURES, IN GRAMS

| Ex. No. | (a) Acrylonitrile | Vinylidene chloride | Ethyl acrylate |
|---|---|---|---|
| 1 | 25 | 50 | 25 |
| 2 | 25 | 55 | 20 |
| 3 | 40 | 40 | 20 |
| 4 | 55 | 25 | 20 |
| 5 | 70 | 10 | 20 |
| 6 | 50 | 25 | 25 |
| 7 | 60 | 10 | 30 |
| 8 | 20 | 50 | 30 |
| 9 | 10 | 70 | 20 |

| Ex. No. | (b) Acrylonitrile | | Methylmethacrylate |
|---|---|---|---|
| 10 | 45 | 35 | 20 |
| 11 | 55 | 30 | 15 |

| Ex. No. | (c) Acrylonitrile | | Methylacrylate |
|---|---|---|---|
| 12 | 50 | 25 | 25 |

| Ex. No. | (d) Acrylonitrile | | Butylacrylate |
|---|---|---|---|
| 13 | 30 | 50 | 20 |

Into a glass lined one liter resin kettle is charged 550 milliliters of water, 0.5 gram sodium alkyl sulfate (Aquarex ME, E. I. du Pont de Nemours, Wilmington, Del.), 2.5 grams $K_2S_2O_8$ and 4.5 grams $NaHSO_3$. The resin kettle is subsequently purged with nitrogen and its contents heated to about 50° C. Fifteen weight percent of one of the above monomer mixtures is then added to the resin kettle while the contents are continuously agitated by means of an immersible stirring rod. The remainder of the monomer mixture is added dropwise to the kettle over a period of about two hours. At the end of the two hour interval the polymerization of the monomers is terminated by coagulation of the latex-type interpolymer emulsion with methanol, and the interpolymer readily separated from the other materials in the kettle by filtration. After separation, the interpolymer resin is washed repeatedly with alternating solution of water and methanol to remove any of the charge residues that may be present therein, and finally dried under a vacuum at 50° C.

Thereafter, 10 grams of the resultant resin is compression molded into a disk approximately 2 inches in diameter and 10 mils in thickness. The physical properties of these disks are then evaluated for oxygen transmission and their heat distortion temperatures also determined. The following table provides the results of these evaluations as well as the analyzed composition of the solid polymer product.

TABLE II.—INTERPOLYMER PROPERTIES

| Ex. No. | Gas trans. rate (GTR) $O_2$ | Heat distortion temperature in ° C. | Composition percent of— | | | |
|---|---|---|---|---|---|---|
| | | | Conversion | Nitrile | $ViCl_2$ | Acrylate |
| 1 | 25 | 66 | 90.5 | 25 | 46 | 29 |
| 2 | 16.05 | 64 | 91.9 | 23 | 52 | 25 |
| 3 | 5.00 | 68 | 82.9 | 42 | 30 | 28 |
| 4 | 4.86 | 78 | 92.8 | 55 | 22 | 23 |
| 5 | 5.40 | 77 | 100.0 | 69 | 08 | 23 |
| 6 | 6.00 | 69 | 90.0 | 50 | 24 | 26 |
| 7 | 12.93 | 67 | 94.4 | 50 | 21 | 29 |
| 8 | 48.41 | 53 | 95.6 | 18 | 47 | 35 |
| 9 | 27.4 | 50 | 81.4 | 8 | 64 | 28 |
| 10 | 3.60 | 89 | 79.0 | 40.5 | 31 | 28.5 |
| 11 | 10.00 | 90 | 82.0 | 45.5 | 32 | 22.5 |
| 12 | (1) | 88 | 74.0 | 39.4 | 28.2 | 32.4 |
| 13 | 41.4 | 54 | 86.3 | 30.6 | 55.0 | 14.4 |

[1] None detected.

The above emulsion polymerization can also be carried out using any of a number of other emulsifiers and free radical initiator systems. For instance, the emulsifier, Aquarex ME (believed to be sodium lauryl sulfate) can be replaced by an equivalent amount of sodium oleate, polyacrylic acid or ammonium oleate. Similarly, oxidizing agents, such as the peroxides can be substituted for the persulfate-bisulfate Redox initiator system used above. Representative of such agents which have traditionally been used in free radical initiation of addition polymerization of olefins are sodium and ammonium persulfate; t-butyl peroctoate; t-butyl peracetate; benzoyl peroxide; azobisisobutyronitrile; lauroyl peroxide; acetyl peroxide; t-butyl perbenzoate; t-butyl hydroperoxide; di-t-butyl peroxide; t-butyl peroxyisopropyl carbonate; 2,5-dimethyl-2; (5-di-t-butyl peroxy) hexane-2,4-dichlorobenzoyl peroxide; p-chlorobenzoyl-peroxide and t-butyl peroxyisobutyrate.

Examples 14 to 17

Thermoplastic solid interpolymers having the hereinbefore described physical properties are prepared according to the emulsion polymerization technique described in Examples 1 to 13 from the following monomeric mixtures:

| Ex. No. | (e) Methacrylonitrile | Vinylidene chloride | Ethylacrylate |
|---|---|---|---|
| 14 | 40 | 40 | 20 |
| 15 | 55 | 25 | 20 |
| 16 | 70 | 10 | 30 |
| 17 | 50 | 25 | 25 |

Examples 18 to 21

Thermoplastic solid interpolymers having the hereinbefore described physical properties are prepared according to the emulsion polymerization technique described in Examples 1 to 13 from the following monomeric mixtures:

| Ex. No. | (f) Methacrylonitrile | Vinylidene chloride | Methylacrylate |
|---|---|---|---|
| 18 | 40 | 40 | 20 |
| 19 | 55 | 25 | 20 |
| 20 | 70 | 10 | 30 |
| 21 | 50 | 25 | 25 |

Examples 22 to 25

Thermoplastic solid interpolymers having the hereinbefore described physical properties are prepared according to the emulsion polymerization technique described in Examples 1 to 13 from the following monomeric mixtures:

| Ex. No. | (g) Methacrylonitrile | Vinylidene chloride | Methylmethacrylate |
|---|---|---|---|
| 22 | 45 | 35 | 20 |
| 23 | 55 | 30 | 15 |
| 24 | 40 | 40 | 20 |
| 25 | 70 | 10 | 30 |

Examples 26 to 29

Thermoplastic solid interpolymers having the hereinbefore described physical properties are prepared according to the emulsion polymerization technique described in Examples 1 to 13 from the following monomeric mixtures:

| Ex. No. | Acrylonitrile/methacrylonitrile (h) (1:1 molar ratio) | Vinylidene chloride | Ethylacrylate |
|---|---|---|---|
| 26 | 40 | 40 | 20 |
| 27 | 55 | 25 | 20 |
| 28 | 70 | 10 | 30 |
| 29 | 50 | 25 | 25 |

Examples 30 to 33

Thermoplastic solid interpolymers having the hereinbefore described physical properties are prepared according to the emulsion polymerization technique described in Examples 1 to 13 from the following monomeric mixtures:

| Ex. No. | (i) Acrylonitrile | Vinylidene chloride | Ethylacrylate/methylethacrylate (1:1 molar ratio) |
|---|---|---|---|
| 30 | 40 | 40 | 20 |
| 31 | 55 | 25 | 20 |
| 32 | 70 | 10 | 30 |
| 33 | 50 | 25 | 25 |

What is claimed is:

1. A thermoplastic interpolymer prepared by addition polymerization of an intimate admixture of nitrile, vinylidene chloride and acrylate monomers, the interpolymer having an oxygen transmission rate of about 50 cubic centimeters-mils per square inch year atmosphere or less, consisting essentially of:

(a) about 23 to about 69 weight percent of units from at least one nitrile monomer of the formula

where R is hydrogen or methyl, (b) about 2 to about 52 weight percent of units from vinylidene chloride, and (c) about 23 to about 33 weight percent of units from at least one acrylate monomer of the formula

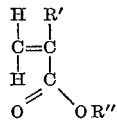

where R' is hydrogen or alkyl of 1 to 4 carbon atoms, and R" is methyl or ethyl, the combined concentration of units from the nitrile monomer or monomers and vinylidene chloride being equal to at least about 65 weight percent.

2. The thermoplastic interpolymer of Claim 1, wherein the interpolymer consists essentially of recurring units from acrylonitrile, vinylidene chloride and methylacrylate.

3. The thermoplastic interpolymer of Claim 1, wherein the interpolymer consists essentially of recurring units from acrylonitrile, vinylidene chloride and ethylacrylate.

4. The thermoplastic interpolymer of Claim 1, wherein the interpolymer consists essentially of recurring units from acrylonitrile, vinylidene chloride and methylmethacrylate.

5. The thermoplastic interpolymer of Claim 1, wherein the interpolymer consists essentially of recurring units from acrylonitrile, vinylidene chloride and methylethacrylate.

6. The thermoplastic interpolymer of Claim 1, wherein the interpolymer consists essentially of recurring units from acrylonitrile, vinylidene chloride and isopropylethacrylate.

7. The thermoplastic interpolymer of Claim 1, wherein the interpolymer consists essentially of recurring units from acrylonitrile, vinylidene chloride and isobutylethacrylate.

8. The thermoplastic interpolymer of Claim 1, wherein the interpolymer consists essentially of recurring units from methacrylonitrile, vinylidene chloride and methylacrylate.

9. The thermoplastic interpolymer of Claim 1, wherein the interpolymer consists essentially of recurring units from methacrylonitrile, vinylidene chloride and ethylacrylate.

10. The thermoplastic interpolymer of Claim 1, wherein the interpolymer consists essentially of recurring units from methacrylonitrile, vinylidene chloride and methylmethacrylate.

11. The thermoplastic interpolymer of Claim 1, wherein the interpolymer consists essentially of recurring units from methacrylonitrile, vinylidene chloride and methylethacrylate.

12. The thermoplastic interpolymer of Claim 1, wherein the interpolymer consists essentially of recurring units from methacrylonitrile, vinylidene chloride and isopropylethacrylate.

13. The thermoplastic interpolymer of Claim 1, wherein the interpolymer consists essentially of recurring units from methacrylonitrile, vinylidene chloride and isobutylethacrylate.

14. The thermoplastic composition of Claim 1, wherein the said nitrile content is in excess of about 40 weight percent.

15. An article of manufacture of the composition of Claim 1.

16. A method for the protection of oxygen sensitive materials from the degradative effects of oxygen in the atmosphere, the method comprising:
(a) providing a thermoplastic packaging material prepared by addition polymerization of an intimate admixture of nitrile, vinylidene chloride and monomers, the thermoplastic packaging material having an oxygen transmission of about 50 cubic centimeters-miles per square inch year atmosphere or less, and consisting essentially of:

(1) about 23 to about 69 weight percent of units from at least one nitrile monomer of the formula

where, R is hydrogen or methyl;
(2) about 8 to about 52 weight percent units from vinylidene chloride; and
(3) about 23 to about 33 weight percent of units from at least one acrylate monomer of the formula

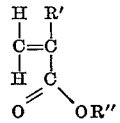

where, R' is hydrogen, alkyl of 1 to 4 carbon atoms, and R" is methyl or ethyl the combined concentration of nitrile monomer or monomers and vinylidene chloride being equal to at least about 65 weight percent;
(b) inserting the oxygen sensitive material in said packaging material; and
(c) sealing the packaging material.

17. The method of Claim 16, wherein the packaging material is in the form of a film.

18. The method of Claim 16, wherein the packaging material is in the form of a container.

19. The thermoplastic interpolymer of claim 1, wherein the interpolymer has a heat distortion temperature in excess of about 64° C. and contains in excess of about 40 weight percent of units of nitrile monomer.

References Cited

UNITED STATES PATENTS

| | | | |
|---|---|---|---|
| 2,278,415 | 4/1942 | Arnold | 260—84 |
| 3,097,178 | 7/1963 | Townsend et al. | 260—23 |
| 3,297,666 | 1/1967 | MacPherson | 260—80.5 |
| 3,310,514 | 3/1967 | Trofimow et al. | 260—29.6 |
| 3,313,757 | 4/1967 | Trofimow et al. | 260—29.6 |

STANFORD M. LEVIN, Primary Examiner